(12) United States Patent
Kohler et al.

(10) Patent No.: US 7,959,770 B2
(45) Date of Patent: Jun. 14, 2011

(54) ELECTROCOATING PLANT

(75) Inventors: Helmut Kohler, Vaihingen (DE); Ralf Schurer, Ostfildern (DE); Michael Dieterich, Asperg (DE)

(73) Assignee: Durr Systems GmbH, Stuttgart (DE)

( * ) Notice: Subject to any disclaimer, the term of this patent is extended or adjusted under 35 U.S.C. 154(b) by 1029 days.

(21) Appl. No.: 11/765,092

(22) Filed: Jun. 19, 2007

(65) Prior Publication Data

US 2007/0261953 A1 Nov. 15, 2007

Related U.S. Application Data

(63) Continuation of application No. PCT/EP2005/013880, filed on Dec. 22, 2005.

(30) Foreign Application Priority Data

Dec. 22, 2004 (DE) .......... 10 2004 061 791

(51) Int. Cl.
*C25D 17/00* (2006.01)
(52) U.S. Cl. .................... 204/198; 204/229.4
(58) Field of Classification Search ............ 204/198, 204/229.4, 230.5
See application file for complete search history.

(56) References Cited

U.S. PATENT DOCUMENTS

| | | |
|---|---|---|
| 1,927,634 A | 9/1933 | Fahrenwald |
| 1,992,467 A | 2/1935 | Blythe |
| 2,077,189 A | 4/1937 | Rishel |
| 2,105,973 A | 1/1938 | Hereford |
| 2,797,006 A | 6/1957 | Thompson |
| 2,818,156 A | 12/1957 | Edwards |
| 2,890,802 A | 6/1959 | Alimanestiano |
| 3,204,785 A | 9/1965 | Bajulaz |
| 3,402,481 A | 9/1968 | LaPan |
| 3,433,236 A | 3/1969 | Koch et al. |
| 3,444,065 A * | 5/1969 | Strosberg .......... 204/480 |
| 3,968,559 A | 7/1976 | Karlsson |
| 4,248,341 A | 2/1981 | Schuck et al. |
| 4,343,395 A | 8/1982 | Lippert et al. |
| 4,564,100 A | 1/1986 | Moon |
| 4,620,373 A | 11/1986 | Laskowski |
| 4,774,773 A | 10/1988 | Zwyssig |
| 4,894,909 A | 1/1990 | Sakamoto et al. |

(Continued)

FOREIGN PATENT DOCUMENTS

DE 47 113 5/1889

(Continued)

*Primary Examiner* — Luan V Van
(74) *Attorney, Agent, or Firm* — Leydig, Voit & Mayer, Ltd.

(57) ABSTRACT

In order to provide an electrocoating plant for coating workpieces, in particular vehicle bodies, comprising at least one immersion bath, in which at least one electrode is disposed, a conveying device, which brings the workpieces into the immersion bath and out of the immersion bath again, and a power supply device, which generates from an a.c. input voltage an output voltage, in particular a d.c. output voltage, one output potential of which is applied to at least one of the workpieces to be coated and the other output potential of which is applied to at least one of the electrodes disposed in the immersion bath, which enables an individual output potential to be applied to each workpiece in a simple manner, it is proposed that the power supply device comprise at least one current control unit which moves together with a workpiece associated with the current control unit through at least one section of the electrocoating plant and provides the output potential for the workpiece associated with the current control unit.

19 Claims, 7 Drawing Sheets

U.S. PATENT DOCUMENTS

| | | |
|---|---|---|
| 4,901,845 A | 2/1990 | Zorgiebel |
| 4,951,802 A | 8/1990 | Weissgerber et al. |
| 5,037,263 A | 8/1991 | Yamashita |
| 5,116,182 A | 5/1992 | Lin |
| 5,217,374 A | 6/1993 | Birks |
| 5,242,045 A | 9/1993 | Kakida et al. |
| 5,263,267 A | 11/1993 | Buttner et al. |
| 5,494,561 A | 2/1996 | Darche et al. |
| 5,553,988 A | 9/1996 | Horn et al. |
| 5,556,466 A | 9/1996 | Martin et al. |
| 5,661,912 A | 9/1997 | Bhatnagar et al. |
| 5,873,165 A | 2/1999 | Bode et al. |
| 6,174,423 B1 * | 1/2001 | Wood et al. .................. 204/512 |
| 6,197,175 B1 | 3/2001 | Kisi et al. |
| 6,269,941 B1 | 8/2001 | Ueno |
| 6,455,817 B1 | 9/2002 | Guzzi et al. |
| 6,557,268 B1 | 5/2003 | Berg et al. |
| 6,990,749 B2 | 1/2006 | Roesler et al. |
| 2001/0030108 A1 | 10/2001 | Hansen |
| 2003/0042113 A1 | 3/2003 | Kasagi |
| 2004/0032061 A1 | 2/2004 | Sachse et al. |
| 2005/0194234 A1 | 9/2005 | Schmohl et al. |
| 2007/0261264 A1 | 11/2007 | Ortlieb et al. |

FOREIGN PATENT DOCUMENTS

| | | | |
|---|---|---|---|
| DE | 1 754 378 U | | 10/1957 |
| DE | 1 060 420 | | 7/1959 |
| DE | 2031105 A | | 1/1971 |
| DE | 2130610 A1 | | 12/1972 |
| DE | 23 24 393 C3 | | 11/1973 |
| DE | 2245991 A1 | | 7/1974 |
| DE | 2451056 A1 | | 5/1976 |
| DE | 2031105 B2 | | 5/1979 |
| DE | 2031105 C3 | | 1/1980 |
| DE | 28 38 974 C2 | | 3/1980 |
| DE | 8321727 U1 | | 12/1983 |
| DE | 3439860 A1 | | 3/1986 |
| DE | 3439860 C2 | | 10/1987 |
| DE | 40 07 707 A1 | | 9/1990 |
| DE | 40 41 211 C1 | | 1/1992 |
| DE | 42 33 970 C2 | | 9/1993 |
| DE | 42 22 349 A1 | | 1/1994 |
| DE | 44 30 882 A1 | | 3/1996 |
| DE | 198 39 725 C1 | | 3/2000 |
| DE | 199 36 879 C1 | | 9/2000 |
| DE | 199 42 556 A1 | | 3/2001 |
| DE | 199 50 202 C2 | | 5/2001 |
| DE | 201 04 205 U1 | | 8/2001 |
| DE | 100 62 084 A1 | | 6/2002 |
| DE | 203 04 601 U1 | | 6/2003 |
| DE | 202 11 083 U1 | | 8/2003 |
| DE | 10238493 A1 | | 3/2004 |
| DE | 103 25 656 B3 | | 7/2004 |
| DE | 102004008812 A1 | | 9/2005 |
| DE | 102004011254 A1 | | 9/2005 |
| DE | 102004056404 A1 | | 5/2006 |
| DE | 102006030334 A1 | | 1/2008 |
| EP | 0 149 694 A1 | | 7/1985 |
| EP | 0 255 620 A2 | | 2/1988 |
| EP | 0 436 081 A1 | | 7/1991 |
| EP | 0581687 A1 | | 2/1994 |
| EP | 0 649 919 B1 | | 4/1995 |
| EP | 1055895 A1 | | 11/2000 |
| EP | 1 424 268 A2 | | 6/2004 |
| EP | 1 510 477 A1 | | 3/2005 |
| FR | 1 076 870 | | 5/1953 |
| FR | 2756815 A | | 6/1998 |
| FR | 2 785 884 A1 | | 5/2000 |
| GB | 120809 A | | 11/1918 |
| GB | 462838 A | | 3/1937 |
| GB | 844309 | | 8/1960 |
| GB | 1 203 789 A | | 9/1970 |
| GB | 1310971 A | | 3/1973 |
| JP | 03-159886 | | 7/1991 |
| JP | 03-186510 | | 8/1991 |
| JP | 8-246194 A | | 9/1996 |
| JP | 08246194 A | * | 9/1996 |
| WO | WO 99/04209 A1 | | 1/1999 |
| WO | WO 02/47894 A1 | | 6/2002 |
| WO | WO 2004/018333 A1 | | 3/2004 |
| WO | WO 2004/081476 A1 | | 9/2004 |
| WO | WO 2004/081476 B1 | | 1/2005 |
| WO | WO 2006/056318 A1 | | 6/2006 |
| WO | WO 2008/000345 A1 | | 1/2008 |

* cited by examiner

ELECTROCOATING PLANT

RELATED APPLICATION

This application is a continuation application of PCT/EP2005/013880 filed Dec. 22, 2005, the entire specification of which is incorporated herein by reference.

FIELD OF DISCLOSURE

The present invention relates to an electrocoating plant for coating workpieces, in particular vehicle bodies, comprising at least one immersion bath, in which at least one electrode is disposed, a conveying device, which brings the workpieces into the immersion bath and out of the immersion bath again, and a power supply device, which generates from an a.c. input voltage an output voltage, in particular a d.c. output voltage, one output potential of which is applied to at least one of the workpieces to be coated and the other output potential of which is applied to at least one of the electrodes disposed in the immersion bath.

BACKGROUND

An electrocoating plant of this kind is known, for example, from DE 103 25 656 B3.

The power supply device of this known electrocoating plant comprises a plurality of power supply units, one pole of which can be selectively connected to one of a plurality of electrode groups and the other pole of which can be connected to one of a plurality of bus bars, which follow one another in the conveying direction of the conveying device. The workpieces are in each case in electrical contact with one of these bus bars while passing through the immersion bath, so that the workpiece lies at the electric potential which is associated with this bus bar. When a workpiece approaches the transition between two consecutive bus bars, these bus bars are connected together in an electrically conductive manner by coupling thyristors.

Due to the division into a plurality of bus bars following one another in the conveying direction, it is possible in the case of this device to apply different output potentials to workpieces passing in succession through the immersion bath if the bus bars are in each case shorter than the distance between two consecutive workpieces. However this means that the workpieces cannot follow one another at any desired short distance.

SUMMARY OF THE INVENTION

The object of the present invention is to provide an electrocoating plant of the type initially mentioned which enables an individual output potential to be applied to each workpiece in a simple manner.

This object is solved according to the invention with regard to an electrocoating plant having the features of the preamble of claim 1 in that the power supply device comprises at least one current control unit which moves together with a workpiece associated with the current control unit through at least one section of the electrocoating plant and provides the output potential for the workpiece associated with the current control unit.

The solution according to the invention is therefore based on the concept of associating with each workpiece passing through the immersion bath a respective mobile current control unit which moves together with the associated workpiece and individually provides the respective desired output potential for the respective associated workpiece instead of the stationary current control units which are used in conventional electrocoating plant and which in each case supply a bus bar with an output potential which is constant along the bus bar.

There is therefore no need in the electrocoating plant according to the invention to divide the bus bar in step with the workpieces, and the workpieces can in principle be moved through the immersion bath in a succession of any desired density.

Generally speaking, the cathodic or the anodic pole of the output voltage can be applied to the workpiece.

The cathodic pole of the output voltage is preferably applied to the workpiece.

In one preferred configuration of the invention the conveying device comprises a plurality of holding racks on which a workpiece to be coated is in each case disposed, and with each holding rack there is associated a respective current control unit, which provides the output potential for the workpiece disposed on the holding rack concerned.

It is in particular possible to dispose on each holding rack a respective current control unit, which provides the output potential for the workpiece disposed on the holding rack concerned.

In order that the output potentials may be individually provided for a plurality of workpieces passing in succession through the immersion bath, it is preferable for the electrocoating plant to comprise a plurality of current control units and for the output potential provided by a current control unit in each case to be independent of the output potentials provided by the respective other current control units.

In order that the coating behaviour in the immersion bath may be optimised in a type-specific manner for each workpiece in accordance with the workpiece type, it is possible for each current control unit to control or regulate the output voltage and/or the output current for the workpiece associated with it according to a voltage characteristic or current characteristic which is predetermined in a type-specific manner in dependence on the workpiece type. Workpieces of different workpiece types which pass through the immersion bath in any desired sequence can thus in each case be coated in a way which is optimised in a type-specific manner.

In one preferred configuration of the invention the power supply device comprises at least one bus bar to which the at least one current control unit can be connected.

In this case it is preferable for the power supply device to comprise a rectifier circuit which generates from the a.c. input voltage an intermediate output voltage, one potential of which is applied to a bus bar to which the at least one current control unit can be connected.

In this case it is also possible for the other potential of the intermediate output voltage to be applied to the at least one electrode in the at least one immersion bath.

It is further possible for the other potential of the intermediate output voltage to be applied to a second bus bar which preferably extends substantially parallel to the first bus bar to which the one potential of the intermediate output voltage is applied.

The rectifier circuit may comprise a diode rectifier bridge which is preferably uncontrolled.

It is further possible for the rectifier circuit to comprise a smoothing circuit for reducing the residual ripple of the intermediate output voltage.

It is advantageously possible for the electrocoating plant to have for at least one immersion bath just one first bus bar to which one potential of the intermediate output voltage is applied, and just one second bus bar to which the other potential of the intermediate output voltage is applied, wherein the at least one current control unit can be connected to the first and the second bus bar.

The presence of just one single first bus bar and just one single second bus bar for each immersion bath simplifies the structure and the assembly of the power supply device. Moreover, all problems which are entailed by the transfer of a workpiece from one bus bar to the bus bar following in the conveying direction disappear. It is possible to dispense with the coupling thyristors which are required in conventional electrocoating plant for connecting two consecutive bus bars in an electrically conductive manner when changing a workpiece from one bus bar to the other. There is also no need for sensors which detect the approach of a workpiece to the transition between two consecutive bus bars.

It is also favourable for at least one bus bar to which the at least one current control unit can be connected and which extends without interruptions over the length of the immersion bath to be associated with at least one immersion bath of the electrocoating plant.

In one preferred configuration of the invention the current control unit, which moves together with a workpiece through a section of the electrocoating plant and provides the output potential for the workpiece associated with the current control unit, comprises a switching element which converts a switching element input voltage supplied to the switching element into a switching element output voltage which is switched at a clock frequency.

A switching element of this kind may in particular comprise at least one field-effect transistor and/or at least one IGBT (Insulated Gate Bipolar Transistor).

The switching element can be switched at a high clock frequency by means of high-speed transistors of this kind, as a result of which the electronic components which are required for the current control unit can be of small dimensions, so that the mobile current control unit is of a low weight and a low volume.

In order that the respective desired output potential for the workpiece associated with the current control unit may be provided in a simple manner, it is possible for the clocked switching element output voltage to have a controllable mark-space ratio.

In order to be able to obtain an output potential characteristic which can be predetermined as desired for the workpiece, it is preferable for the current control unit to have a regulating circuit which activates the switching element in dependence on a desired output voltage.

The clock frequency at which the switching element output voltage is clocked is advantageously at least approximately 10 kHz, preferably at least approximately 20 kHz.

In order to prevent electromagnetic emission effects, it is favourable for the clock frequency to be at most approximately 200 kHz, preferably at most approximately 100 kHz.

The current control unit may also comprise a smoothing circuit in order to reduce the residual ripple of the output potential of the current control unit.

In one special configuration of the invention the current control unit comprises a pulse-shaping circuit. It is thus possible to apply an output potential pulsed at a repetition frequency of approximately 1 kHz to approximately 10 kHz, for example, to the workpiece. This can lead to improved coating results, in particular when coating hollow bodies.

Further features and advantages of the invention constitute the subject matter of the following description and the graphic representation of an embodiment.

BRIEF DESCRIPTION OF THE DRAWINGS

The same or functionally equivalent elements are designated by the same reference characters in all the figures.

DETAILED DESCRIPTION OF THE INVENTION

Figure 1:
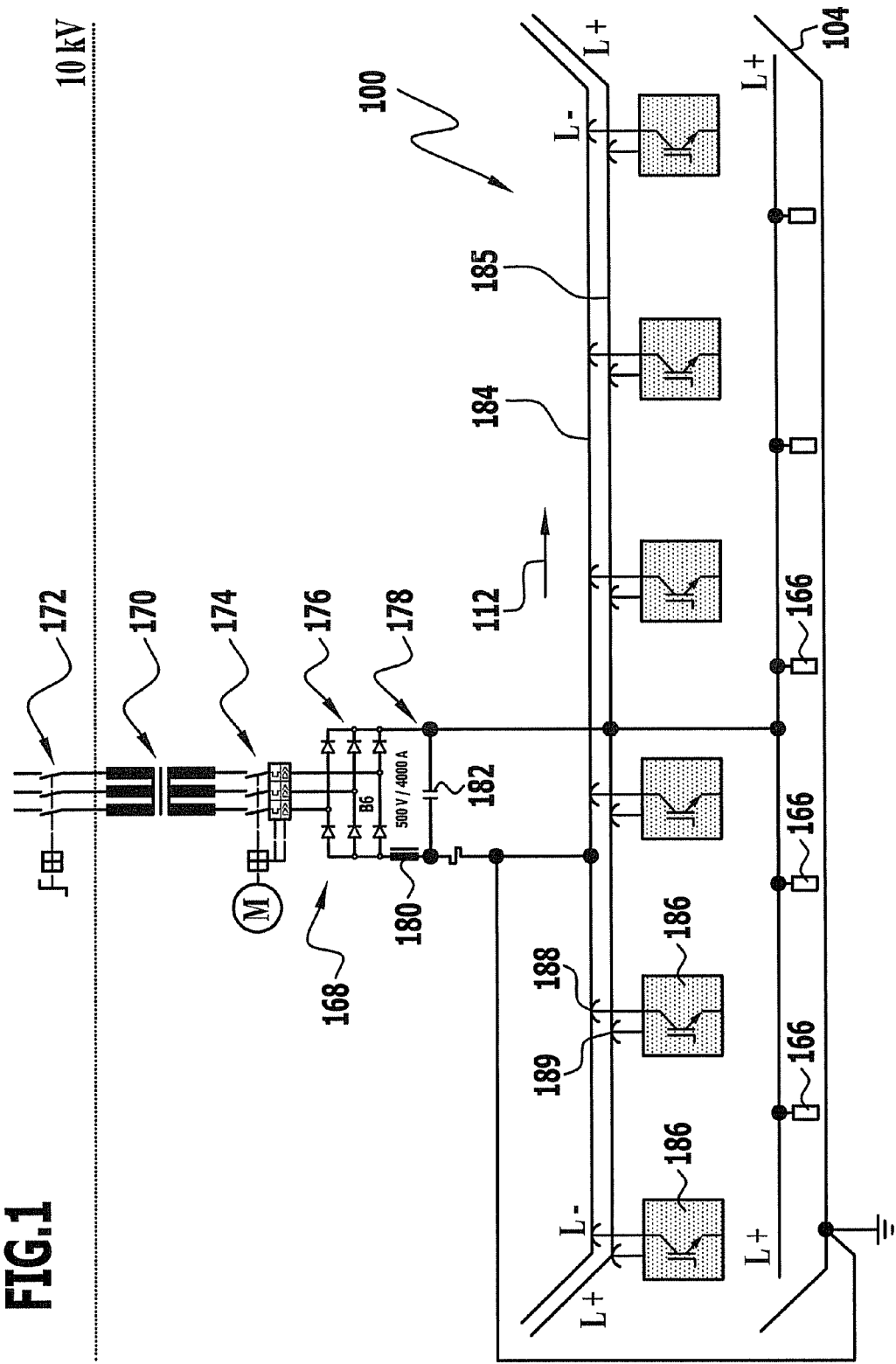
FIG. 1 is a schematic representation of a power supply device of an electrocoating plant with current control units moved together with the workpieces.

An electrocoating plant which is shown in FIGS. 1 to 7 and designated as whole by 100 for coating vehicle bodies 102 comprises at least one immersion tank 104 which is filled to a bath level 106 with an immersion bath 108 of a coating liquid.

The electrocoating plant 100 also comprises a conveying device 110 by means of which the vehicle bodies 102 can be brought completely into the immersion bath 108, moved in the completely immersed state along a translational direction 112 through the immersion bath 108 and then brought out of the immersion bath 108 again.

The conveying device 110 comprises a guide device 114 which has two guide rails 116a, 116b, one of which in each case extends on the left side and on the right side, respectively, of the immersion bath 108 parallel to the translational direction 112.

Figure 5:
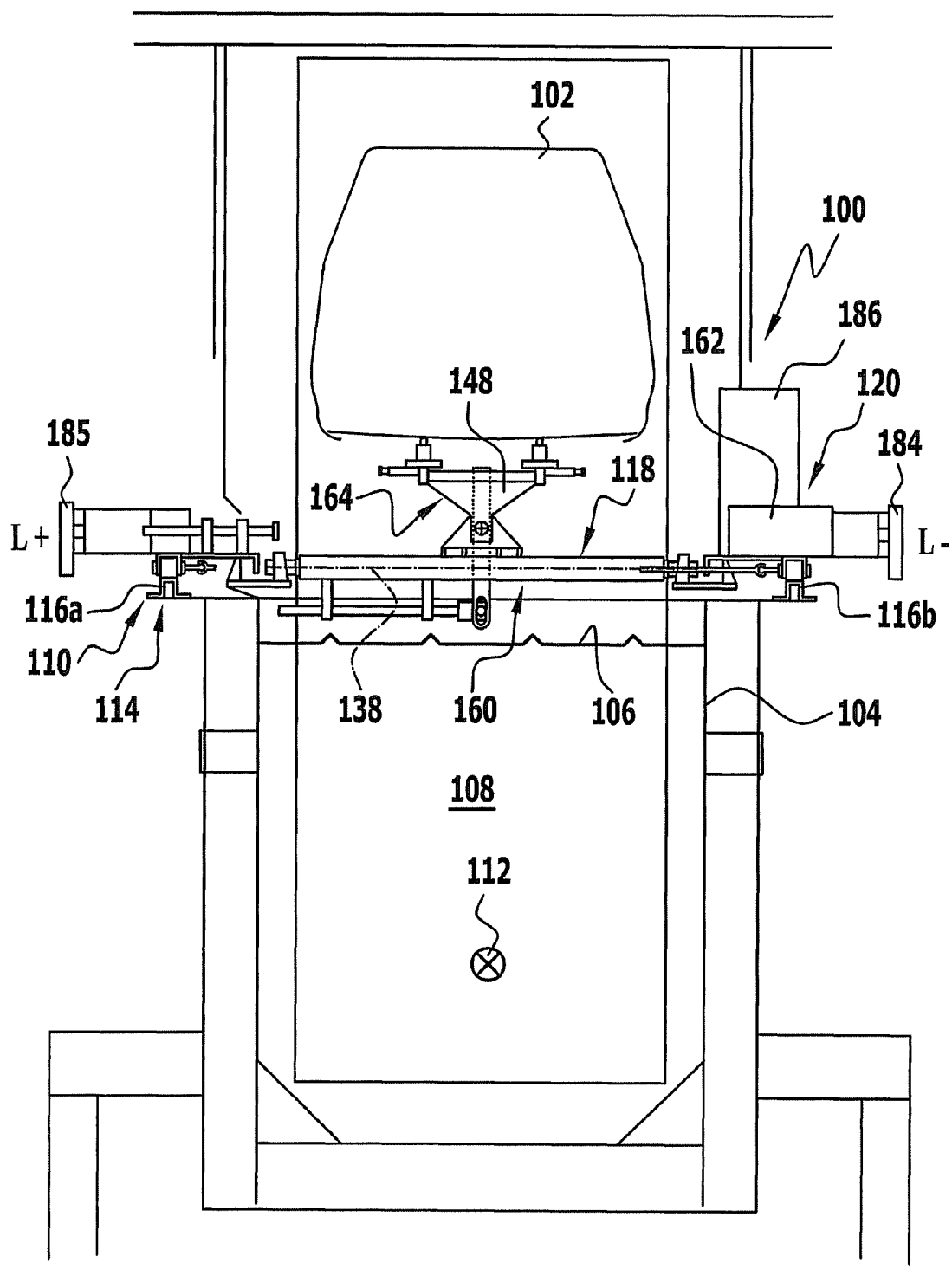
FIG. 5 is a schematic cross section through the electrocoating plant, with a vehicle body disposed above the immersion bath.

As can best be seen from FIG. 5, both guide rails 116a, 116b are disposed above the bath level 106 of the immersion bath 108.

The conveying device 110 also comprises a plurality of holding racks 118 (only one of which is in each case shown in FIGS. 3 to 7) which can travel unassisted and independently of one another along the guide device 114 of the conveying device 110 and follow one another at a distance along the guide device 114.

Figure 4:
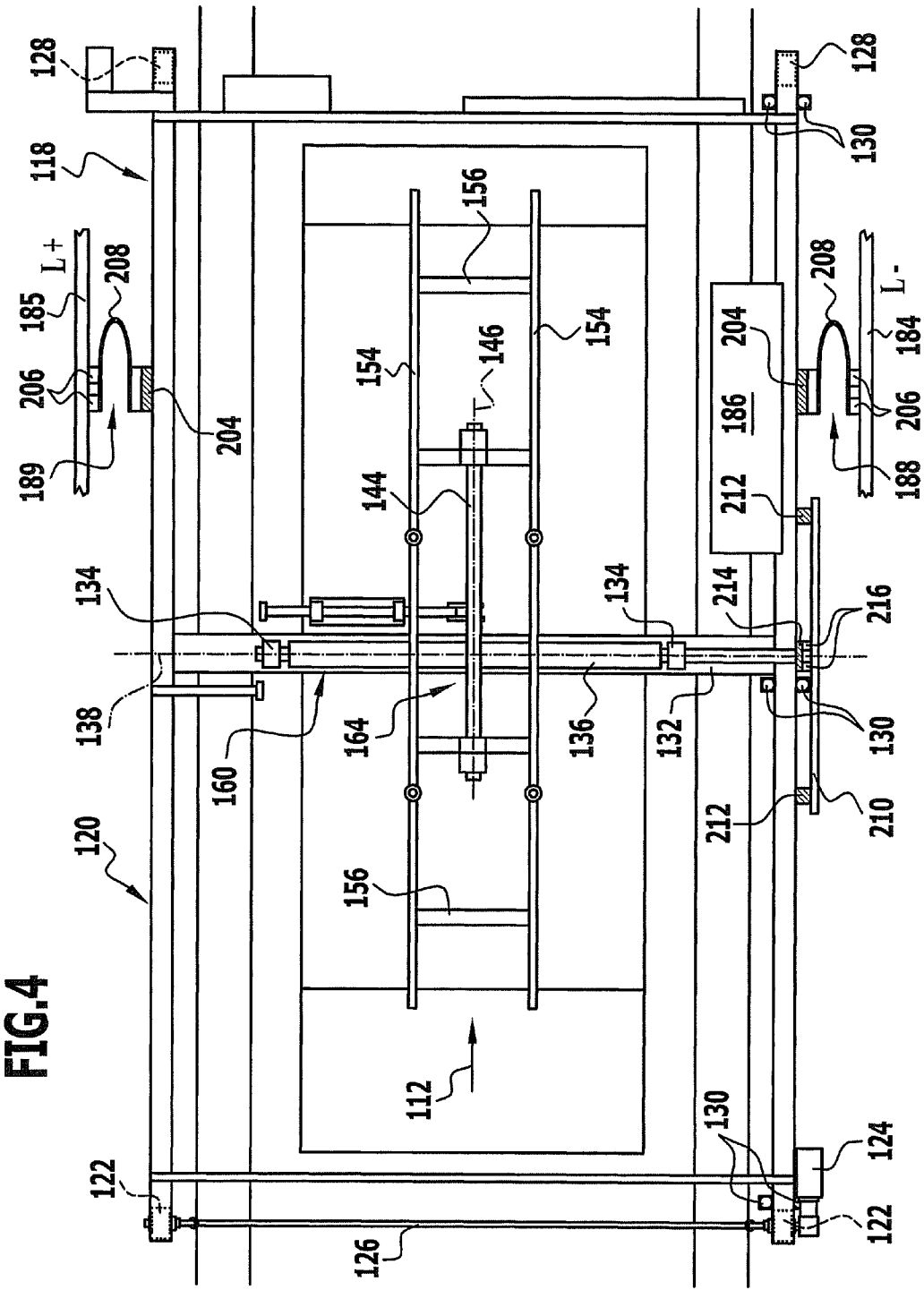
FIG. 4 is a schematic plan view from above onto the holding rack from FIG. 3.

As can best be seen from FIG. 4, each of the holding racks 118 comprises a base part 120 which is guided on the guide device 114 and substantially has the shape of a rectangular frame.

At its end which is at the rear (viewed in the translational direction 112) the base part 120 is provided with two driven rollers 122 which in each case roll on a horizontal top side of the respective associated guide rail 116a, 116b.

One of the two driven rollers 122 can be driven by means of a translational drive motor 124, which is disposed on the base part 120, directly into a rotational movement which is transmitted by means of an articulated shaft 126 to the opposite, indirectly driven roller 122.

The base part 120 of the holding rack 118 can travel along the translational direction 112 through the friction between the driven rollers 122 on the one hand and the guide rails 116a, 116b on the other.

At its end which is at the front (viewed in the translational direction 112) the base part 120 is supported by means of two non-driven rollers 128 on the top side of the guide rails 116a and 116b, respectively.

Lateral guidance of the base part 120 at the guide device 114 is guaranteed by a plurality of pairs of guide rollers 130 which roll on mutually opposite vertical guide faces of one of the guide rails 116a, 116b.

The base part 120 also comprises an approximately centrally disposed crossmember 132 which bears two bearing blocks 134 which are spaced apart transversely to the translational direction 112 and on which the ends of a turning-in shaft 136 are mounted so as to be rotatable about a turning-in axis 138 extending horizontally and perpendicularly to the translational direction 112.

Figure 3:
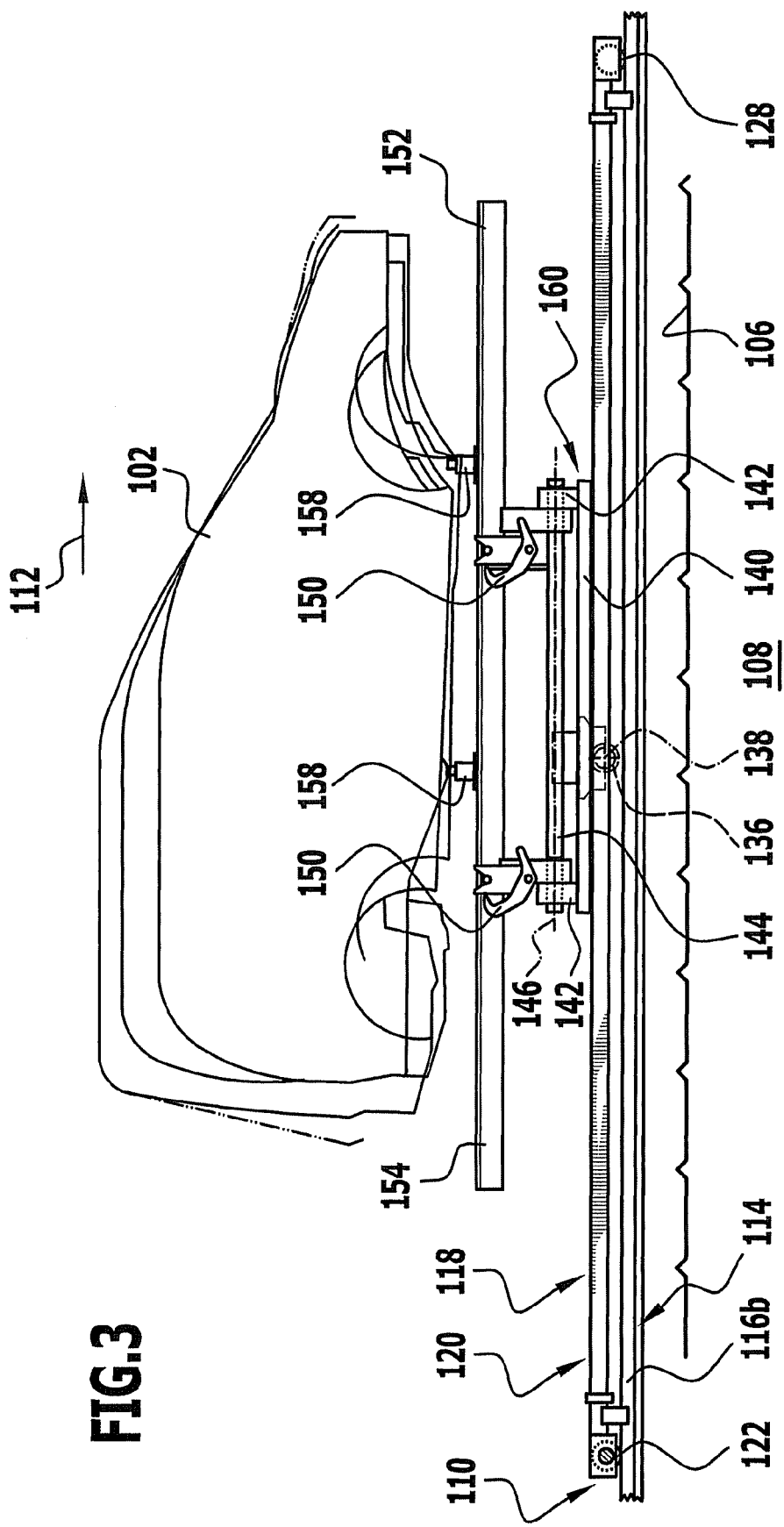
FIG. 3 is a schematic side view of a vehicle body which is disposed on a holding rack of the electrocoating plant and located above the bath level of an immersion bath.

As can best be seen from FIG. 3, a rotary platform 140 is fixed to the turning-in shaft 136, which platform bears at its front end and at its rear end a respective bearing block 142, wherein a rotary shaft 144 is mounted on the bearing blocks 142 so as to be rotatable about an axis of rotation 146 which is perpendicular to the turning-in axis 138.

Supports 148 are fixed to the rotary shaft 144, which supports bear clamping devices 150 by means of which a skid frame 152 bearing the vehicle body can be detachably fixed to the holding rack 118.

The skid frame 152 comprises two skid shoes 154 which extend parallel to the longitudinal axis of the vehicle body and are connected together by way of cross braces 156. The clamping devices 150 act on several of these cross braces 156 in order to hold the skid frame 152 on the holding rack 118.

Furthermore, several of the cross braces 156 of the skid frame 152 are provided with locking devices 158 by means of which the vehicle body 102 can be detachably fixed to the skid frame 152.

Several possible external contours, which are alternative to one another, are drawn in FIG. 3 for the actual vehicle body 102.

Together with the rotary platform 140 and the bearing blocks 142, the turning-in shaft 136 forms a rotary part, designated as a whole by 160, of the holding rack 118, which part is moved with the base part 120 along the translational direction 112 and can be rotated relative to the base part 120 about the turning-in axis 138 through any desired angles in any desired direction of rotation by means of a turning-in drive motor 162 which is provided on the base part 120, is moved with the latter and coupled by way of a gear unit to the turning-in shaft 136.

The rotary shaft 144, the supports 148 and the clamping devices 150 together form a holding part, designated as a whole by 164, of the holding rack 118, which part is moved with the rotary part 160 and therefore with the base part 120 along the translational direction 112 and can be rotated relative to the rotary part 160 about the axis of rotation 146 by means of a rotary drive device which is not described in detail here but is disclosed in DE 102 58 132 A1.

The conveying device 110 described above for bringing the vehicle body 102 into the immersion bath 108 and for bringing it out again functions as follows:

The vehicle body 102 is initially located in the standard position which is shown in FIG. 3 and in which window openings of the vehicle body are disposed above an understructure of the vehicle body.

The holding rack 118 is then moved by means of the translational drive motor 124 along the guide device 114 up to the beginning of the immersion bath 108.

The vehicle body 102 is brought into the immersion bath 108 in the initial region of the immersion bath 108 by rotating the rotary part 160 relative to the base part 120 about the turning-in axis 138 through an angle of 180°.

Figure 6:
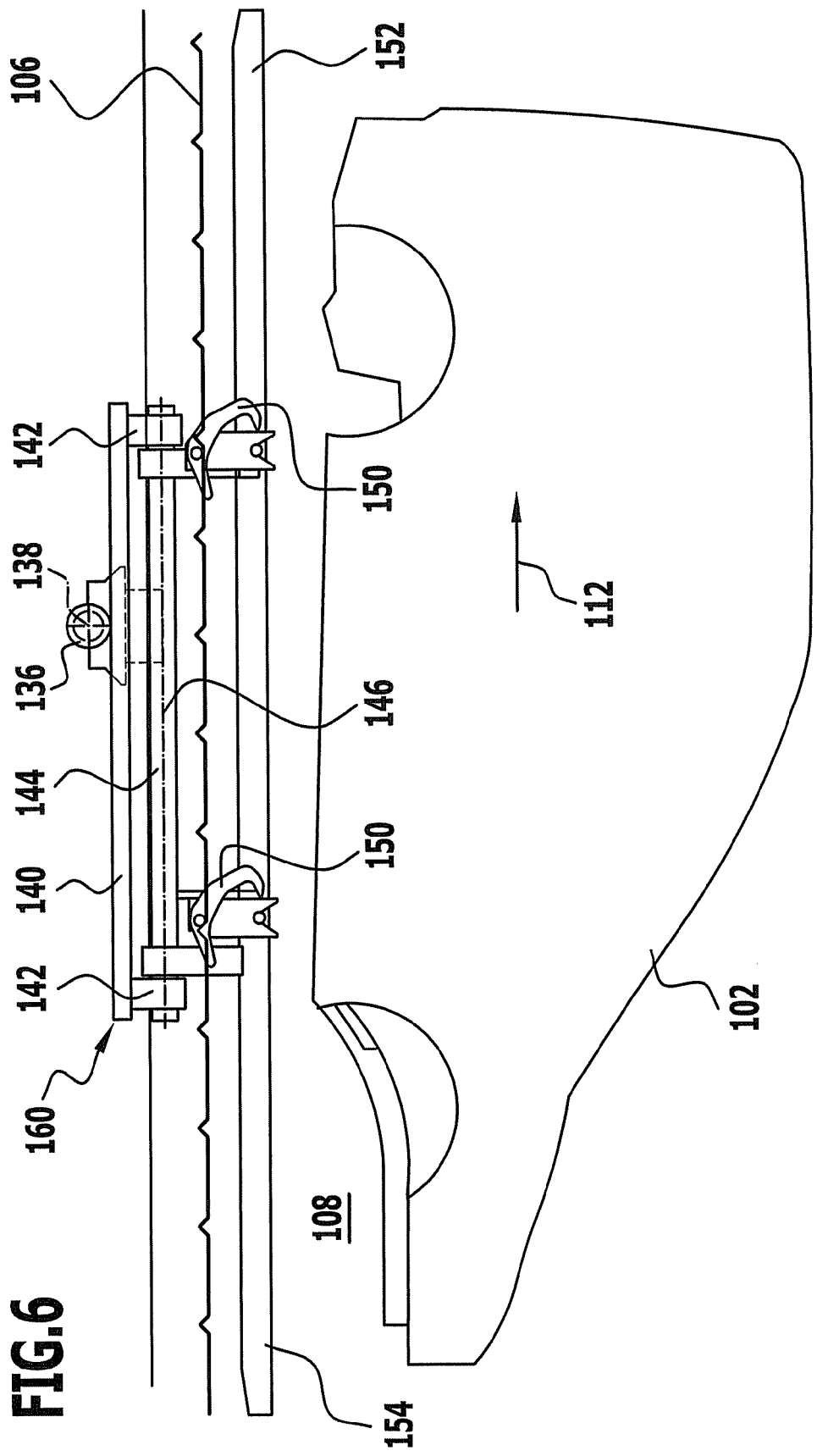
FIG. 6 is a schematic side view of the vehicle body which is disposed on a holding rack of the electrocoating plant and located below the bath level of the immersion bath.
Figure 7:
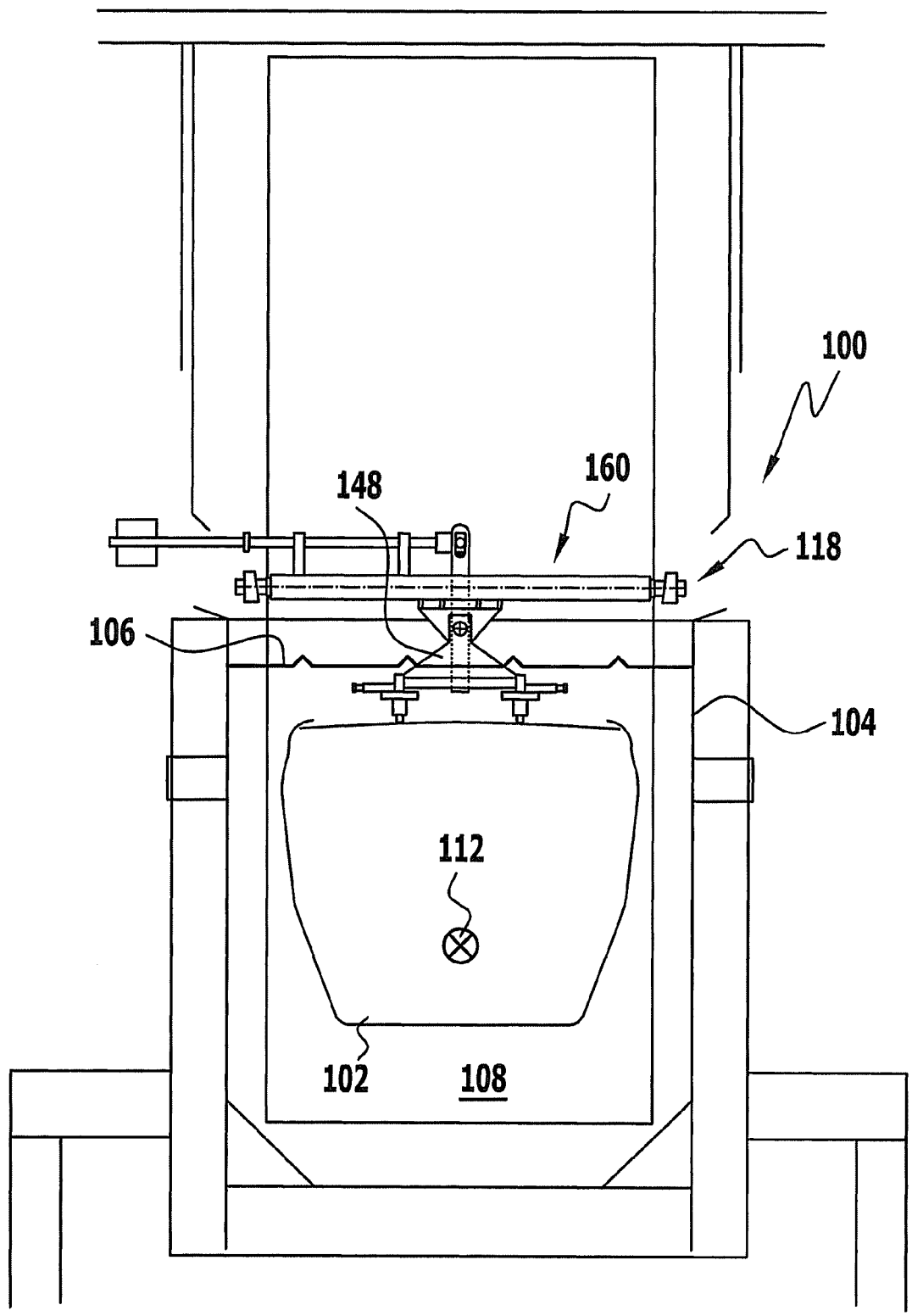
FIG. 7 is a schematic cross section through the electrocoating plant, with a vehicle body completely immersed in the immersion bath.

Following the completion of the rotational movement of the rotary part 160 relative to the base part 120, the vehicle body 102 has been transferred from the original standard position to the inverted position which is shown in FIG. 6 and in which the window openings of the vehicle body 102 are disposed below the understructure of the vehicle body.

The vehicle body 102 is completely immersed in the immersion bath 108 in this immersion position, which is reached following the completion of the rotational movement of the rotary part 160.

The base part 120 of the holding rack 118 is located completely above the bath level 106 when the vehicle body 102 is in the immersion position. The vehicle body 102 is moved in the completely immersed state through the immersion bath 108 in the translational direction 112 by the continuation of the translational movement, which is driven by the translational drive motor 124, of the base part 120.

When the vehicle body 102 has reached the end region of the immersion bath 108 on account of the translational movement of the base part 120 along the guide device 114, the vehicle body 102 is brought out of the immersion bath 108 again by rotating the rotary part 160 relative to the base part 120 about the turning-in axis 138 through an angle of 180°.

This turning-out movement of the rotary part 160 can take place in the same direction of rotation as the turning-in movement or in the direction of rotation opposite to the turning-in movement.

In order to deposit the coating particles contained in the coating liquid of the immersion bath 108 on the surfaces of the vehicle bodies 102 which are to be coated, the vehicle bodies are connected while they pass through the immersion tank 104 to the cathodic potential of an electric field which is generated between the vehicle bodies 102 on one side and electrodes 166 on the other, the latter being disposed in dialysis cells (not shown) in the immersion bath 108 on both sides of the conveying path of the vehicle bodies 102 and connected to the anodic potential of the electric field.

Figure 2:
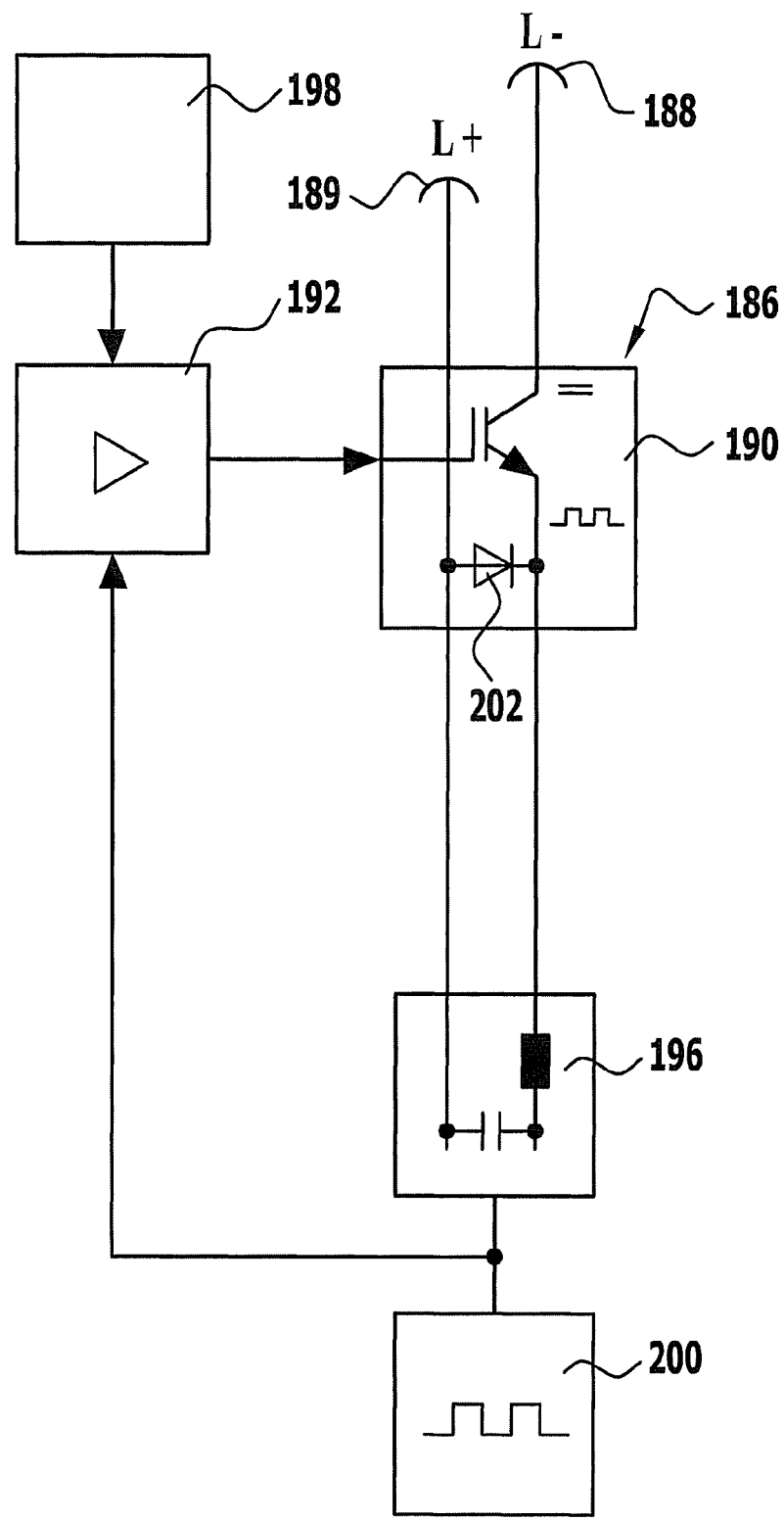
FIG. 2 is a schematic block diagram of a current control unit.

The power supply device 168, which is shown in FIGS. 1 and 2, of the electrocoating plant 100 serves to produce this potential difference between the vehicle bodies 102 and the electrodes 166.

As can be seen from FIG. 1, the power supply device 168 comprises a three-phase transformer 170 which is connected on the primary side by way of a primary-side switch 172 to a three-phase mains voltage with an amplitude of, for example, approximately 10 kV and on the secondary side by way of a secondary-side switch 174 to the three inputs of an uncontrolled three-phase diode rectifier bridge circuit B6 (designated by the reference character 176).

A smoothing circuit 178 is connected downstream of the rectifier bridge circuit 176 in order to pre-smooth the rectified output voltage of the rectifier bridge circuit 176.

This smoothing circuit 178 may in particular comprise a choke 180 and a capacitor 182.

The output voltage of the smoothing circuit 178 is at most approximately 500 V. The output current of the smoothing circuit 178 is at most approximately 4000 A.

As can be seen from FIG. 1, the cathodic pole of the output voltage of the smoothing circuit 178, which serves as intermediate output voltage of the power supply device 168, is connected to a metallic enclosure of the immersion tank 104 and earthed together with the same.

The same pole is also connected to a first bus bar 184 which extends along the translational direction 112 from the entry region of the immersion bath 108 to the exit region of the immersion bath 108 over substantially the entire length of the immersion bath 108.

The anodic pole of the intermediate output voltage is connected to the electrodes 166 which are disposed in the immersion bath 108 and which are thereby connected to anodic potential.

The same pole is also connected to a second bus bar 185 which extends along the translational direction 112 from the entry region of the immersion bath 108 to the exit region of the immersion bath 108 over substantially the entire length of the immersion bath 108 and substantially parallel to the first bus bar 184.

In order to provide the cathodic potential for the respective vehicle body which is held on a holding rack 118, each holding rack 118 comprises a current control unit 186 which is disposed on the base part 120 of the holding rack 118 and, for example, in electrically conductive contact by way of a first sliding contact 188 with the first bus bar 184 and by way of a second sliding contact 189 with the second bus bar 185.

As can be seen from FIGS. 4 and 5, the first bus bar 184 may, for example, be disposed on the right of the conveying path of the holding racks 118 and the second bus bar 185 on the left of the conveying path of the holding racks 118.

The first sliding contact 188 is held by way of an insulator 204 on the base part 120 and comprises a plurality of contact blocks 206 (for example of contact carbon) which slide along the first bus bar 184 and, by way of a flexible cable or a flexible conductor track 208, are held in contact with the first bus bar 184 and connected in an electrically conductive manner to the current control unit 186, which is also held on the base part 120.

The second sliding contact 189, by way of which the current control unit 186 is connected in an electrically conductive manner to the second bus bar 185, is constructed in the same way as the first sliding contact 188 and comprises in particular a plurality of contact blocks 206 and a flexible cable or a flexible conductor track 208.

Details of the current control unit 186 are illustrated in the following with reference to the block diagram of FIG. 2.

Each current control unit 186 comprises a switching element 190, the first input of which is connected to the sliding contact 188 and the second input of which is connected to the sliding contact 189, and a regulating circuit 192, the output of which is connected to a control input of the switching element 190 and which activates the switching element with a control voltage which consists of rectangular pulses with a repetition frequency of, for example, approximately 20 kHz and a variable width and therefore variable mark-space ratio.

The switching element 190 chops the intermediate output voltage which is supplied to the input of the same at the timing which is predetermined by the control voltage and with the pulse widths which are predetermined by the control voltage, so that the output voltage of the switching element is a pulsed voltage which is switched at the repetition frequency of the control voltage.

The output voltage of the switching element 190 is smoothed by a smoothing circuit 196 which is connected downstream of the rectifier 194 and comprises, for example, an LC element with a choke and a capacitor, so that the output voltage of the smoothing circuit 196 is a substantially constant d.c. voltage with a very low residual ripple in the region of, for example, approximately 1%.

This output voltage is supplied as actual value to a first input of the regulating circuit 192.

The setpoint value with which the regulating circuit 192 compares the actual value is supplied to a second input of the regulating circuit 192 by a setpoint value generator 198.

The mark-space ratio of the control voltage which is delivered by the regulating circuit 192 to the switching element 190 is determined by the regulating circuit 192 in accordance with the difference between the actual value and the setpoint value of the output voltage.

A memory may be provided in the setpoint value generator 198, from which memory a predetermined output voltage characteristic as a function of time is retrieved as a setpoint value variable with time.

It is thus possible, by means of the current control unit 186, to generate a regulated output voltage which follows a predetermined output voltage characteristic as a function of time.

The potential difference between a vehicle body 102 and the electrodes 166 of the electrocoating plant 100 can thus be varied with time individually in a predetermined manner for the vehicle body 102 in question while the vehicle body 102 passes through the immersion bath 108.

The characteristic as a function of time of the output voltage of the current control unit 186 can in particular be controlled in accordance with the type of vehicle body 102 respectively associated with the current control unit 186 by the setpoint value generator 198 selecting an output voltage characteristic associated with the respective type from a plurality of output voltage characteristics stored in the memory thereof and the setpoint value delivered to the regulating circuit 192 being varied with time accordingly.

The information as to the type of the vehicle body 102 in each case disposed on the holding rack 118 can be transmitted by a central computer to the setpoint value generator 198 by way of a data bus.

As an alternative to this it is also possible for the current control unit 186 to be provided with a sensor which establishes the type of the vehicle body 102 by interacting with an identifier fitted to the vehicle body 102.

The output of the smoothing circuit 196 of the current control unit 186 may be directly connected to the respective vehicle body 102 in order to apply a non-pulsed d.c. voltage to the vehicle body 102.

However it is also possible, as shown in FIG. 2, for the current control unit 186 to comprise a pulse shaper 200 which is connected downstream of the smoothing circuit 186 and generates from the smoothed output voltage of the smoothing circuit 196 a rectangular pulse sequence with a repetition frequency which lies, for example, in the range from approximately 1 kHz to approximately 10 kHz. The output of the pulse shaper 200 is connected to the vehicle body 102, so that this pulsed output voltage is applied to the vehicle body 102.

A pulsed output voltage of this kind can lead to improved coating results, in particular when coating hollow bodies.

Appropriate pulse-shaping circuits are known per se, for which reason details of a circuit of this kind are not dealt with here.

The electrically conductive connection of the output of the pulse shaper 200 to the vehicle body 102 may take place, for example, by way of a bus bar 210 which is held laterally on the base part of the holding rack 118, extends parallel to the translational direction 112, is held by way of insulators 212 on the base part and connected by way of a cable (not shown) to the output of the pulse shaper 200.

The end of the turning-in shaft 136 which is directed towards this bus bar 210 is lengthened into the vicinity of the bus bar 210 and bears at its front face which faces the bus bar 210, by way of an insulator 214, a plurality of contact blocks 216 which are disposed in a rotationally rigid manner on the insulator 214 and therefore on the turning-in shaft 136, are in electrically conductive contact with the bus bar 210 and slide on the surface of the bus bar 210 which faces the contact blocks 216 when the turning-in shaft 136 executes a rotational movement about the turning-in axis 138.

The contact blocks 216 are connected in an electrically conductive manner to a cable (not shown) which is passed through the insulator 214 into the interior space of the turning-in shaft 136 and extends through the turning-in shaft 136 up to the longitudinal centre plane of the rotary part 160. In the region of the longitudinal centre plane of the rotary part 160 this cable emerges through an opening in the convex surface of the turning-in shaft 136 and extends out from here up to a contact point at the vehicle body 102. On account of its flexibility, this cable can follow the movements of the vehicle body 102 when the latter is swivelled about the axis of rotation 146.

A power transistor is preferably used as electronic switch in the switching element 190.

This power transistor may in particular be formed as a field-effect transistor or as an IGBT (Insulated Gate Bipolar Transistor).

The switching element 190 may also comprise a freewheeling diode 202.

The coating particles travel towards the vehicle bodies 102 and accumulate on the surfaces thereof in the electric field which is generated between the vehicle bodies 102 and the electrodes 166.

Owing to the fact that a particular current control unit 186, which is moved with the respective holding rack 118, is associated with each holding rack 118 and therefore each vehicle body 102, it is possible to individually provide the output voltage for each individual vehicle body, so that the characteristic as a function of time of the output voltage and/or of the output current can be individually programmed for each vehicle body 102.

As the individual output voltage for each vehicle body 102 is generated by means of the current control units 186 moved at the same time, it is not necessary to divide the first bus bar 184 or the second bus bar 185 along the translational direction 112 into a plurality of sections which are electrically separated from one another.

Therefore all problems which could be entailed by the transfer of a vehicle body 102 from one bus bar section to the next bus bar section disappear.

There is in particular no need for switchable contact elements, for example coupling thyristors, in order to electrically connect together bus bar sections following one another in the translational direction 112 while transferring a vehicle body 102 from one bus bar section to the following bus bar section.

It is also possible to dispense with the sensors which are required in conventional electrocoating plant for controlling the transfer between two consecutive bus bar sections and which detect the approach of a vehicle body 102 to the end of a bus bar section.

The invention claimed is:

1. Electrocoating plant for coating workpieces,
    comprising at least one immersion bath, in which at least one electrode is disposed,
    a conveying device, which brings the workpieces into the immersion bath and out of the immersion bath again, and
    a power supply device, which generates an output voltage from an a.c. input voltage, one output potential of which is applied to at least one of the workpieces to be coated and the other output potential of which is applied to at least one of the electrodes disposed in the immersion bath,
    wherein the power supply device comprises at least one current control unit which moves together with a workpiece associated with the current control unit through at least one section of the electrocoating plant and provides the output potential for the workpiece associated with the current control unit,
    wherein the power supply device comprises a first bus bar and a second bus bar to which the at least one current control unit can be connected, and
    wherein the first bus bar is earthed, and
    wherein the first bus bar and the second bus bar are associated with at least one immersion bath of the electrocoating plant and extends without electrical interruption over the length of the immersion bath.

2. Electrocoating plant according to claim 1, wherein the conveying device comprises a plurality of holding racks on which a workpiece to be coated is in each case disposed, and wherein with each holding rack there is associated a respective current control unit, which provides the output potential for the workpiece disposed on the holding rack concerned.

3. Electrocoating plant according to claim 2, wherein there is disposed on each holding rack a respective current control unit, which provides the output potential for the workpiece disposed on the holding rack concerned.

4. Electrocoating plant according to claim 1, wherein the electrocoating plant comprises a plurality of current control units, and wherein the output potential provided by a current control unit in each case is independent of the output potentials provided by the respective other current control units.

5. Electrocoating plant according to claim 1, wherein each current control unit controls or regulates the output voltage and/or the output current for the workpiece associated with it according to a voltage characteristic or current characteristic which is predetermined in a type-specific manner in dependence on the workpiece type.

6. Electrocoating plant according to claim 1, wherein the power supply device comprises a rectifier circuit which generates an intermediate output voltage from the a.c. input voltage, wherein one potential of which the intermediate output voltage is applied to a bus bar to which the at least one current control unit can be connected.

7. Electrocoating plant according to claim 6, wherein the other potential of the intermediate output voltage is applied to the at least one electrode in the at least one immersion bath and/or to a further bus bar to which the at least one current control unit can be connected.

8. Electrocoating plant according to claim 6, wherein the rectifier circuit comprises a diode rectifier bridge which is preferably uncontrolled.

9. Electrocoating plant according to claim 6, wherein the rectifier circuit comprises a smoothing circuit for reducing the residual ripple of the intermediate output voltage.

10. Electrocoating plant according to claim 1, wherein the current control unit comprises a switching element which converts a switching element input voltage supplied to the switching element into a switching element output voltage which is switched at a clock frequency.

11. Electrocoating plant according to claim 10, wherein the switching element comprises at least one field-effect transistor and/or at least one IGBT.

12. Electrocoating plant according to claim 10, wherein the clocked switching element output voltage has a controllable mark-space ratio.

13. Electrocoating plant according to claim 10, wherein the current control unit has a regulating circuit which controls the switching element in dependence on a desired output voltage.

14. Electrocoating plant according to claim 10, wherein the clock frequency is at least approximately 10 kHz, preferably at least approximately 20 kHz.

15. Electrocoating plant according to claim 1, wherein the clock frequency is at most approximately 200 kHz, preferably at most approximately 100 kHz.

16. Electrocoating plant according to claim 1, wherein the current control unit comprises a smoothing circuit.

17. Electrocoating plant according to claim 1, wherein the current control unit comprises a pulse-shaping circuit.

18. Electrocoating plant according to claim 1, wherein the workpieces are vehicle bodies.

19. Electrocoating plant according to claim 1, wherein the output voltage generated by the power supply device is a d.c. output voltage.

* * * * *